US 8,761,058 B2

(12) United States Patent
Chen (10) Patent No.: US 8,761,058 B2
(45) Date of Patent: *Jun. 24, 2014

(54) BROADBAND SERVICE NESTING PROCESSING METHOD AND DEVICE, AND SERVICE APPLICATION SERVER

(71) Applicant: Huawei Technologies Co., Ltd., Guangdong (CN)

(72) Inventor: Fei Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,977

(22) Filed: Jul. 10, 2013

(65) Prior Publication Data
US 2013/0301477 A1 Nov. 14, 2013

Related U.S. Application Data

(63) Continuation of application No. 13/709,924, filed on Dec. 10, 2012, which is a continuation of application No. PCT/CN2011/084023, filed on Dec. 15, 2011.

(30) Foreign Application Priority Data

Dec. 21, 2010 (CN) .......................... 2010 1 0613221

(51) Int. Cl.
*H04L 12/16* (2006.01)
*H04L 12/66* (2006.01)

(52) U.S. Cl.
USPC ........................................... 370/259; 370/352

(58) Field of Classification Search
None
See application file for complete search history.

(56) References Cited

U.S. PATENT DOCUMENTS

| 5,581,544 A | 12/1996 | Hamada et al. |
| 2006/0104431 A1* | 5/2006 | Emery et al. ............. 379/211.04 |
| 2007/0201665 A1* | 8/2007 | Kocan et al. ............. 379/201.02 |
| 2007/0220588 A1* | 9/2007 | Panda et al. ....................... 726/1 |

(Continued)

FOREIGN PATENT DOCUMENTS

| CN | 1905489 A | 1/2007 |
| CN | 101039468 A | 9/2007 |

(Continued)

OTHER PUBLICATIONS $2^{nd}$ Office Action in corresponding Chinese Patent Application No. 201010613221.8 (May 31, 2013).

(Continued)

*Primary Examiner* — Chi Pham
*Assistant Examiner* — Soon-Dong D Hyun
(74) *Attorney, Agent, or Firm* — Leydig, Voit & Mayer, Ltd.

(57) ABSTRACT

The present invention provides a broadband service nesting processing method and device, and a service application server. The method includes: receiving a service request message sent to a user equipment, and obtaining a service identity of a current service carried in the service request message; determining that service nesting is formed between a terminating call service and a service corresponding to the service identity of the current service; and evading the terminating call service according to a result of the service nesting formed between the terminating call service and the service corresponding to the service identity. A technical solution provided in an embodiment of the present invention can effectively avoid the occurrence of service nesting phenomena.

8 Claims, 6 Drawing Sheets

(56) References Cited

U.S. PATENT DOCUMENTS

| | | | |
|---|---|---|---|
| 2008/0137646 A1* | 6/2008 | Agarwal et al. | 370/352 |
| 2008/0162637 A1* | 7/2008 | Adamczyk et al. | 709/204 |
| 2010/0091706 A1* | 4/2010 | Noldus et al. | 370/328 |
| 2012/0093148 A1 | 4/2012 | Luo et al. | |
| 2012/0265849 A1* | 10/2012 | Bakker et al. | 709/217 |

FOREIGN PATENT DOCUMENTS

| | | | |
|---|---|---|---|
| CN | 101094088 A | 12/2007 | |
| CN | 101132401 A | 2/2008 | |
| CN | 101247572 A | 8/2008 | |
| CN | 101594357 A | 12/2009 | |
| CN | 102143153 A | 8/2011 | |
| EP | 2106061 A1 | 9/2009 | |
| EP | 2166712 A1 | 3/2010 | |

OTHER PUBLICATIONS

Extended European Search Report in corresponding European Patent Application No. 11851326.6 (Jul. 9, 2013).

"ATIS Exploratory Group on Convergence (EGC)—Report and Recommendations," Sep. 2007, Alliance for Telecommunications Industry Solutions, Washington, DC.

International Search Report in corresponding PCT Patent Application No. PCT/CN2011/084023 (Mar. 22, 2012).

Written Opinion of the International Searching Authority in corresponding PCT Patent Application No. PCT/CN2011/084023 (Mar. 22, 2012).

* cited by examiner

BROADBAND SERVICE NESTING PROCESSING METHOD AND DEVICE, AND SERVICE APPLICATION SERVER

CROSS-REFERENCE TO RELATED APPLICATIONS

This application is a continuation of U.S. patent application Ser. No. 13/709,924, filed on Dec. 10, 2012, which is a continuation of International Patent Application No. PCT/CN2011/084023, filed on Dec. 15, 2011. The International Patent Application claims priority to Chinese Patent Application No. 201010613221.8, filed on Dec. 21, 2010. The aforementioned patent applications are hereby incorporated by reference in their entireties.

FIELD OF THE INVENTION

Embodiments of the present invention relate to broadband service technologies, and in particular, to a broadband service nesting processing method and device, and a service application server.

BACKGROUND OF THE INVENTION

Nesting of multiple broadband services exists in an IP multimedia system (hereafter referred to as IMS), especially when a user subscribes to SIP Terminal call (hereafter referred to as STC) services, such as call hold and call transfer. Terminating call services of that type are processed by a terminating call service server.

For example, in the case of a conference call, a conference service server routes calls of participants A, B, and C, where user B subscribes to a call hold service in terminating call services. When the user B receives another call, user B holds the original call and answers the new incoming call. A terminating call service server of B identifies that B initiates a call hold operation and needs to play a hold tone to a caller leg of B. In a site where B is located, all participants (excluding B) hear the hold tone, which disturbs the normal order of the site.

In another case, a user subscribes to a wake-up call service. At the wake-up time specified by user A, a wake-up call service server delivers a route to a number of user A. In normal conditions, a terminal equipment of user A rings, achieving the purpose of wake-up. In this case, if user A subscribes to a terminating call service and a service such as call forwarding unconditional or one number link you, an incoming wake-up call is transferred to another forwarded-to number, and the purpose of waking up A through an alarm tone cannot be achieved.

The preceding current services (conference call and wake-up call services) cannot be normally performed due to impacts of subsequent terminating call services (call hold and call transfer). Situations where the preceding current services cannot be normally performed due to mutual impacts between the current services and the subsequent terminating call services are collectively referred to as broadband service nesting, and no effective technical solution is provided in the prior art.

SUMMARY OF THE INVENTION

Embodiments of the present invention provide a broadband service nesting processing method and device, and a service application server to effectively solve broadband service nesting problems.

An embodiment of the present invention provides a broadband service nesting processing method, including: receiving a service request message sent to a user equipment, and obtaining a service identity of a current service carried in the service request message; determining that service nesting is formed between a terminating call service and a service corresponding to the service identity of the current service; and evading the terminating call service according to a result of the service nesting formed between the terminating call service and the service corresponding to the service identity.

An embodiment of the present invention provides another broadband service nesting processing method, including: generating, by a service application server, a service request message sent to a user equipment, where the service request message carries a service identity of a current service used to evade service nesting; and sending, by the service application server, the service request message to a broadband service nesting processing device, so that the broadband service nesting processing device determines that service nesting is formed between a terminating call service and a service corresponding to the service identity of the current service, and evades the terminating call service according to a result of the service nesting formed between the terminating call service and the service corresponding to the service identity.

The present invention further provides a broadband service nesting processing device, including: a first receiving module, configured to receive a service request message sent to a user equipment, where an extended header field of the service request message carries a service identity of a current service; a nesting determining module, configured to determine that service nesting is formed between a terminating call service and a service corresponding to the service identity of the current service; and a service processing module, configured to evade the terminating call service according to a result of the service nesting formed between the terminating call service and the service corresponding to the service identity.

The present invention further provides a service application server, including:
  a service request generating module, configured to generate a service request message sent to a user equipment, where the service request message carries a service identity of a current service used to evade service nesting; and
  a sending module, configured to send the service request message to a broadband service nesting processing device, so that the broadband service nesting processing device determines that service nesting is formed between a terminating call service and a service corresponding to the service identity of the current service, and evades the terminating call service according to a result of the service nesting formed between the terminating call service and the service corresponding to the service identity.

The broadband service nesting processing method and device, and service application server provided in the present invention perform nesting evading processing for a subsequent terminating call service when determining, based on a service identity of the current service carried in an extended header field of a service request message, that service nesting is formed between a current service and the terminating call service, effectively solving service nesting problems.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

In order to make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
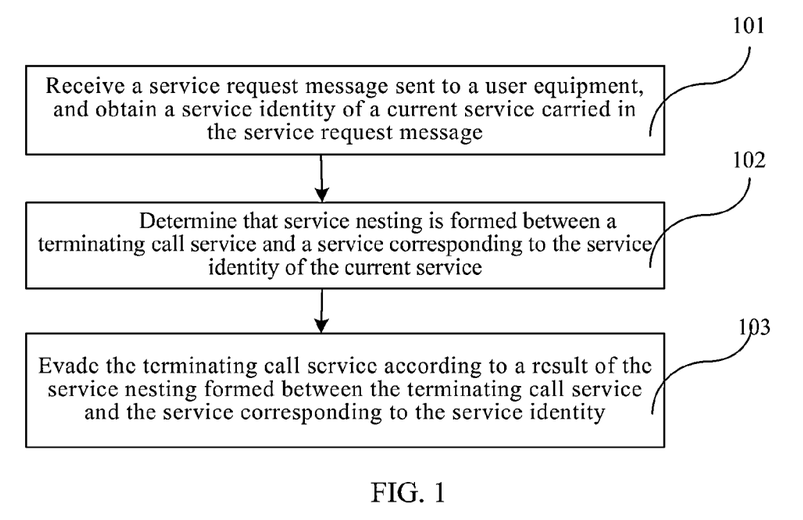
FIG. 1 is a schematic flow chart of Embodiment 1 of a broadband service nesting processing method of the present invention.

An embodiment of the present invention provides a broadband service nesting processing method. FIG. 1 is a schematic flow chart of Embodiment 1 of a broadband service nesting processing method of the present invention. As shown in FIG. 1, the method includes the following steps:

Step 101: Receive a service request message sent to a user equipment, and obtain a service identity of a current service carried in the service request message.

The service identity may be carried in a header field of the service request message, for example, carried in a PAS (P-Asserted-Service) header field or carried in other extended header fields, and may also be carried in other parts of the service request message.

Step 102: Determine that service nesting is formed between a terminating call service and a service corresponding to the service identity of the current service.

This step may specifically be pre-storing a service nesting list, where the service nesting list stores mapping relationships between various terminating call services and services having service nesting relationships with the terminating call services. After the service request message is received, according to the service identity of the current service carried in the message, a terminating call service which forms service nesting with a service corresponding to the service identity is determined.

Step 103: Evade the terminating call service according to a result of the service nesting formed between the terminating call service and the service corresponding to the service identity.

On the basis of the preceding steps, after service nesting is determined to probably be formed between the terminating call service and the service corresponding to the service identity, service nesting evading processing is performed accordingly.

In the preceding embodiment, a broadband service nesting processing device identifies the service identity carried in the service request message sent to the user equipment, and when determining that service nesting will be formed between the current service and a subsequent terminating call service according to the preceding service identity of the current service (that is, the current service and the subsequent terminating call service mutually affect each other, resulting in a situation where the current service cannot be performed normally), the broadband service nesting processing device performs nesting evading processing for the terminating call service, which can effectively solve service nesting problems.

In the preceding embodiment, there are multiple manners for determining that service nesting is formed between the terminating call service and the service corresponding to the service identity, such as configuring a service nesting list or configuring certain rules. For example, service nesting formed between the terminating call service and the service corresponding to the service identity may be determined according to the service nesting list, where the service nesting list stores mapping relationships between various terminating call services and services having service nesting relationships with the terminating call services.

For the diversity of evading processing manners of the subsequent terminating call service, terminating call service processing may include two situations. One is to implement the subsequent terminating call service, but control implementation of the subsequent terminating call service, preventing the current service from being affected due to nesting; in this case, the broadband service nesting processing device that implements the preceding method is also arranged on a subject that implements the subsequent terminating call service, namely a terminating call service server. The other is to directly prohibit the implementation of the subsequent terminating call service, that is, the subsequent service in service nesting is not implemented. In this case, the broadband service nesting processing device that implements the preceding method should be arranged on a subject that implements the current service, namely a core network node such as a call session control entity.

Figure 2:
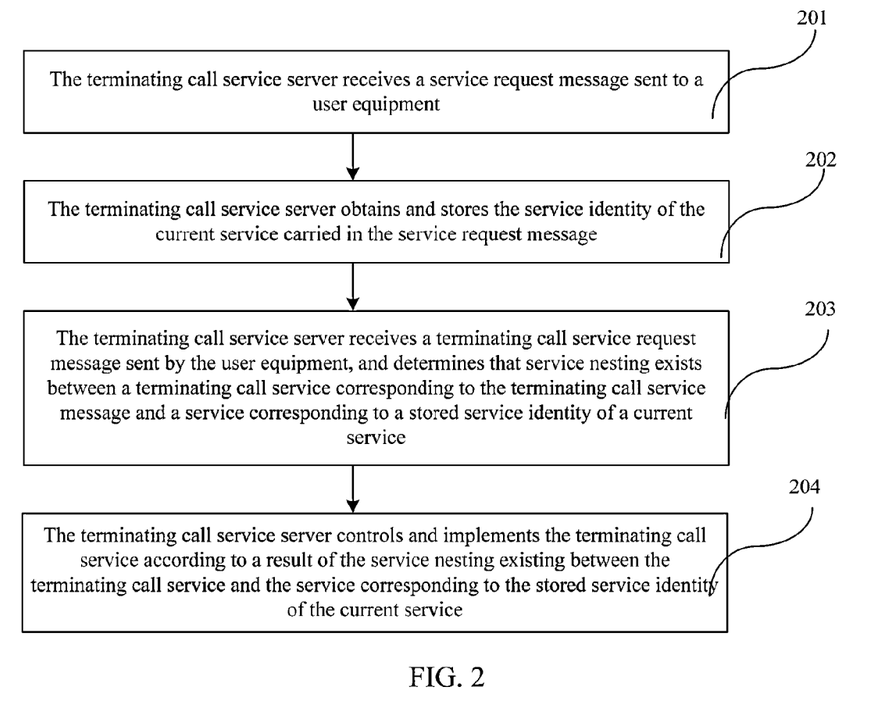
FIG. 2 is a schematic flow chart of Embodiment 2 of a broadband service nesting processing method of the present invention.

FIG. 2 is a schematic flow chart of Embodiment 2 of a broadband service nesting processing method of the present invention. This is an embodiment for the preceding situation 1. All procedures may be completed by a broadband service nesting processing device arranged on a terminating call service server. As shown in FIG. 2, the method includes the following steps:

Step 201: The terminating call service server receives a service request message sent to a user equipment. This embodiment is for situations where service nesting may be formed between a current service and a subsequent terminating call service. An application server of the current service carries a service identity in a PAS header field of a service request message sent by the application server, and sends the service request message to the terminating call service server.

Step 202: The terminating call service server obtains and stores the service identity of the current service carried in the service request message.

Step 203: The terminating call service server receives a terminating call service request message sent by the user equipment, and determines that service nesting exists between a terminating call service corresponding to the terminating call service message and a service corresponding to the stored service identity of the current service, where the determination may be specifically implemented by querying a service nesting list.

Step 204: The terminating call service server controls and implements the terminating call service according to a result of the service nesting existing between the terminating call service and the service corresponding to the stored service identity of the current service. In this embodiment, the terminating call service is implemented, but service features that may affect the ongoing current service are evaded.

In the preceding step 202, the terminating call service server has stored the service identity of the ongoing current service for the preceding user equipment, and therefore further controls and implements the terminating call service according to the result of the service nesting existing between the terminating call service and the service corresponding to the stored service identity of the current service when receiving the terminating call service request message, ensuring that the terminating call service does not affect the ongoing current service.

In the preceding embodiment of the present invention, for situations where service nesting may occur, a service identity is added in a PAS header field of a service request message sent to a user equipment, enabling the terminating call service server to obtain and store the preceding service identity, that is, the ongoing current service of the user equipment is recorded. The stored service identity may be deleted when the service is completed. Therefore, when receiving a terminating call service request message, the terminating call service server determines whether nesting emerges between the terminating call service and an ongoing service, namely a service corresponding to a stored service identity, and performs corresponding processing. For example, for a call hold service, a terminating call service, a hold tone generally needs to be played. However, when an ongoing previous click to conference service of the user equipment has been recorded, no hold tone is sent, preventing other participants of the ongoing conference from being affected.

Figure 3:
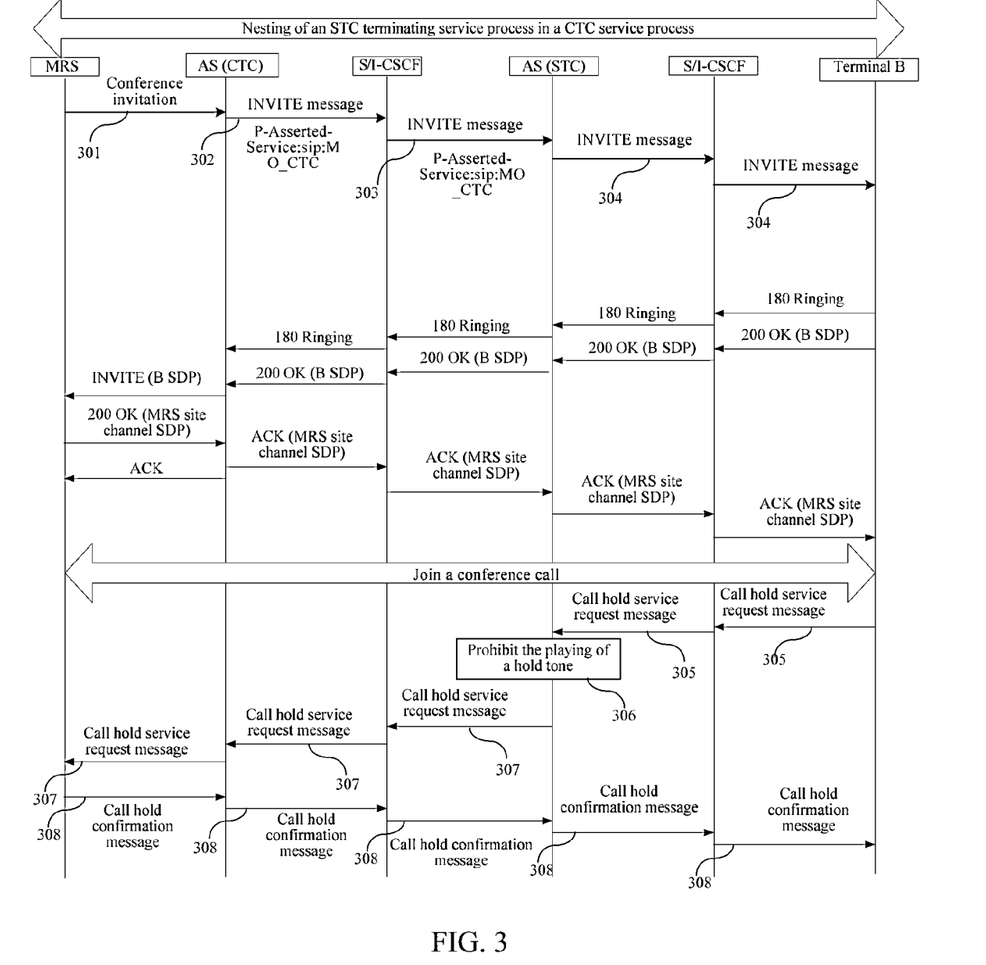
FIG. 3 is a schematic flow chart of Embodiment 3 of a broadband service nesting processing method of the present invention.

The preceding technical solution of the present invention may be used to solve nesting of a call hold service process in a click to conference service process. FIG. 3 is a schematic flow chart of Embodiment 3 of a broadband service nesting processing method of the present invention. As shown in FIG. 3, the method includes the following steps:

Step 301: A media resource server (hereafter referred to as MRS) initiates a conference invitation to a user equipment of a conference call participant. That is, a click to conference (hereafter referred to as CTC) server initializes a CTC call.

Step 302: A CTC application server sends a conference call service request message, for example, an INVITE message to a core network node (for example, a call session control entity S/I-CSCF). The CTC application server may be called AS (CTC). A PAS header field of the conference call request message carries a service identity of a current service, and the specific form of the service identity may be "P-Asserted-Service:sip:MO_CTC".

Step 303: The core network node (for example, the call session control entity S/I-CSCF) receives the INVITE message and forwards the INVITE message to an STC application server, namely an AS (STC). The STC application server resolves the PAS header field of the INVITE message, and obtains and stores a service identity thereof, that is, records an ongoing conference call service of the user equipment.

Step 304: The STC application server sends the INVITE message to the core network node S/I-CSCF, and the core network node sends the INVITE message to the user equipment (Terminal B). Then the user equipment returns response messages to the media resource server, where the response messages include a ringing response message and an off-hook response message, namely 180 Ring and 200 OK (B SDP). In this step, the AS (CTC) sends an INVITE (B SDP) message to the MRS and receives a returned 200 OK (MRS site channel SDP) message. The AS (CTC) establishes a response message, namely an ACK (MRS site channel SDP) message, according to the preceding returned site channel SDP, and establishes a site channel SDP between the media resource server and the user equipment, and the user equipment joins the conference call.

Step 305: During the conference call process, the user equipment receives another call request. Because the equipment subscribes to a service process of the call hold service, an STC service, therefore the user equipment will hold the conference call service and answer the new call. The user equipment sends a call hold service request message to the STC application server, and the terminating call service request message is sent to the STC application server, namely the AS (STC), through the core network node S/I-CSCF.

Step 306: After receiving the call hold service request message sent by the user equipment, the STC application server identifies that the user equipment is implementing a conference call service and that service nesting will occur between the call hold service and the conference call service, and then prohibits the playing of a hold tone, and only sends a call hold service request message to the media resource server.

Step 307: The call hold service request message is sent to the media resource server through the core network node (for example, the call session control entity S/I-CSCF) and the AS (CTC).

Step 308: The media resource server returns a call hold confirmation message to the user equipment.

In the preceding embodiment of the present invention, the service request message sent to the user equipment carries identity information, and the STC application server stores the identity information, and does not play a hold tone when receiving a call hold service request message sent by the user equipment, preventing other participants of the conference call from being disturbed. The problem caused by nesting of the call hold service in the conference call service is solved.

Except the call hold service, the nested terminating call service triggered in the preceding embodiment of the present invention may also be nesting of a one number link you service. An embodiment of the present invention further provides another broadband service nesting processing method.

Figure 4:
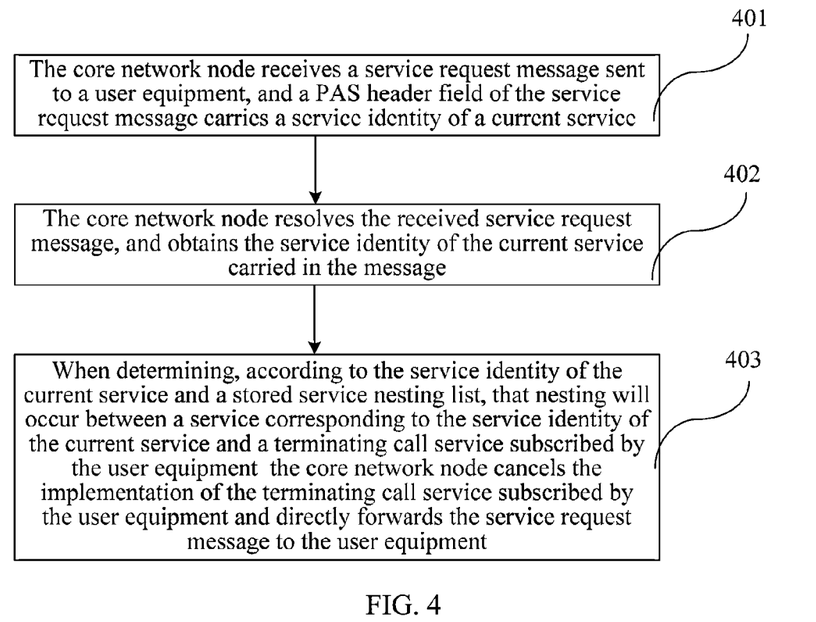
FIG. 4 is a schematic flow chart of Embodiment 4 of a broadband service nesting processing method of the present invention.

Different from the preceding nesting processing implemented by an STC service application server, in this embodiment, a core network node implements nesting processing according to a service identity carried in a PAS header field. FIG. 4 is a schematic flow chart of Embodiment 4 of the broadband service nesting processing method of the present invention, namely for the preceding situation 2. As shown in FIG. 4, the method includes the following steps:

Step 401: The core network node receives a service request message sent to a user equipment, and a PAS header field of the service request message carries a service identity of a current service. This embodiment is for situations where service nesting may occur. A server carries a service identity of a current service in the PAS header field of a service request message sent by the server, and the core network node receives the service request message.

Step 402: The core network node resolves the received service request message, and obtains the service identity of the current service carried in the message.

Step 403: When determining, according to the service identity of the current service and a stored service nesting list, that nesting will occur between a service corresponding to the service identity of the current service and a terminating call service subscribed by the user equipment, the core network node cancels the implementation of the terminating call service subscribed by the user equipment and directly forwards the service request message to the user equipment. Specifically, in the embodiment, the core network node implements nesting evading for the current service and a subsequent terminating call service that may occur, and avoids the occurrence of service nesting and prevents the normal implementation of the current service from being affected by refusing to implement the subsequent terminating call service.

In the broadband service nesting processing method provided in the preceding embodiment of the present invention, based on the service identity carried in the PAS header field of the service request message, when receiving the service request message, the core network node first obtains the service identity, and determines, according to the service identity, whether to implement the terminating call service. For example, when the service corresponding to the service identity is a wake-up call service, though the user equipment subscribes to a call transfer service, the call transfer service is not implemented; instead, the wake-up call service is directly implemented, and therefore nesting between the wake-up call service and the call transfer service can be avoided, and the wake-up call service can be successfully completed.

Figure 5:
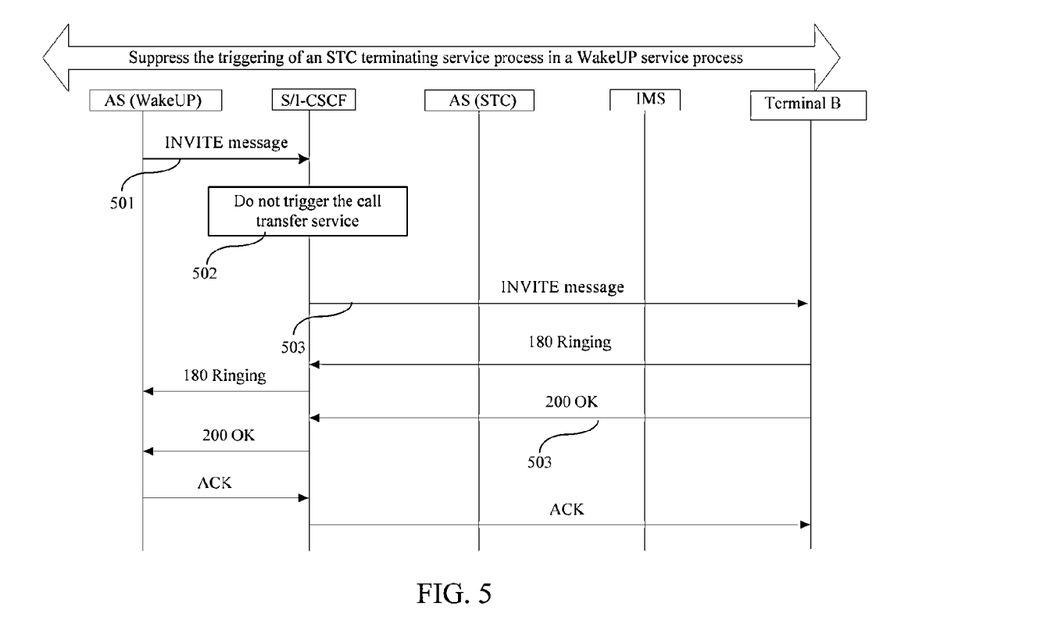
FIG. 5 is a schematic flow chart of Embodiment 5 of a broadband service nesting processing method of the present invention.

FIG. 5 is a schematic flow chart of Embodiment 5 of a broadband service nesting processing method of the present invention. The method takes nesting of a call transfer service in a wake-up call service as an example. As shown in FIG. 5, the method includes the following steps:

Step 501: A wake-up call service application server sends a wake-up call service request message, for example, an INVITE message, to a user equipment at a scheduled time. The wake-up call service request message is first sent to a core network service node, for example, an S/I-CSCF, and a PAS header field of the message carries a wake-up call service identity, for example, "P-Asserted-Service: sip:MO_WakeUP".

Step 502: After receiving the wake-up call service request message (INVITE message), a call session control entity, namely the core network service node (S/I-CSCF), obtains the service identity of the wake-up call service from the PAS header field of the message. The core network service node (S/I-CSCF) detects that the service is a wake-up call service according to the service identity, and finds that the user equipment also subscribes to a call transfer service (for example, call forwarding unconditional and one number link you) according to the subscription information of the user equipment. However, according to a stored service nesting list, service nesting will occur between the wake-up call service and the call transfer service. Therefore, the core network service node (S/I-CSCF) does not trigger the call transfer service, but instead, directly implements the wake-up call service, that is, directly forwards the INVITE message to a target user equipment. Different from determining whether to implement a subsequent terminating call service according to a service nesting list, a rule may also be configured on the core network service node (S/I-CSCF): If the PAS header field of the received INVITE message carries "P-Asserted-Service: sip:MO_WakeUP", then suppress the triggering of the wake-up call service, a terminating call service, and determine whether service nesting will occur in real time.

Step 503: After receiving the INVITE message, the user equipment completes a wake-up operation and returns a confirmation message (200 OK) to the wake-up call service application server.

The broadband service nesting processing method provided in the preceding embodiment of the present invention can effectively avoid the occurrence of service nesting problems through a method of carrying a service identity in the PAS header field. The broadband service nesting processing methods provided in the preceding embodiments of the present invention solve service nesting problems by carrying a service identity in a PAS header field of a service request message, where the service identity carried in the PAS header field supports multiple forms such as letters or numbers. In addition, the PAS header field is a quite independent header field; when the PAS header field is used to identify a service, processing of services on the rear side is not affected. Therefore, for a service triggered on the front side, only an identity of the service needs to be recorded in the PAS header field, with no need to pay attention to whether a nesting problem will be triggered due to the triggering of a terminating call service. In addition, the two successively implemented services may be decoupled, with no need to share the basic service user data. Currently, virtual switches (Centrex) have more and more supplementary service features, and phenomena of nesting between services are increasing. The present invention provides a nesting processing solution, so that the core network node or a subsequent service server identifies the service processes that have been triggered before.

Figure 6:
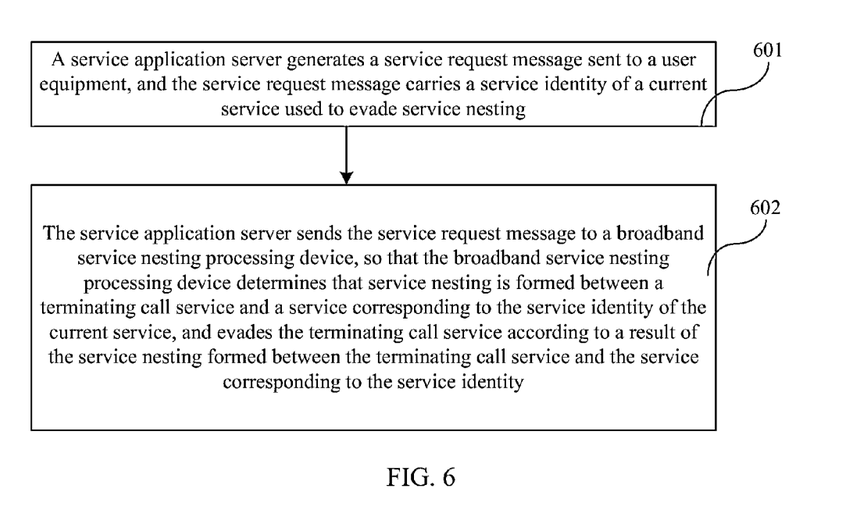
FIG. 6 is a schematic flow chart of Embodiment 6 of a broadband service nesting processing method of the present invention.

An embodiment of the present invention further provides another broadband service nesting processing method. The processing method corresponds to the embodiment shown in FIG. 1, and is implemented on the service request sending end. FIG. 6 is a schematic flow chart of Embodiment 6 of a broadband service nesting processing method. As shown in FIG. 6, the method includes the following steps:

Step 601: A service application server generates a service request message sent to a user equipment, where the service request message carries a service identity of a current service used to evade service nesting;

specifically, when initiating a service request in this step, the service server carries a service identity in the service request message sent to the user equipment, avoiding the occurrence of service nesting.

Step 602: The service application server sends the service request message to a broadband service nesting processing device, so that the broadband service nesting processing device determines that service nesting is formed between a terminating call service and a service corresponding to the service identity of the current service, and evades the terminating call service according to a result of the service nesting formed between the terminating call service and the service corresponding to the service identity. The preceding core network node or terminating call service server may evade the occurrence of service nesting according to the service identity. For details, see the embodiments shown in FIG. 1 to FIG. 5.

Figure 7:
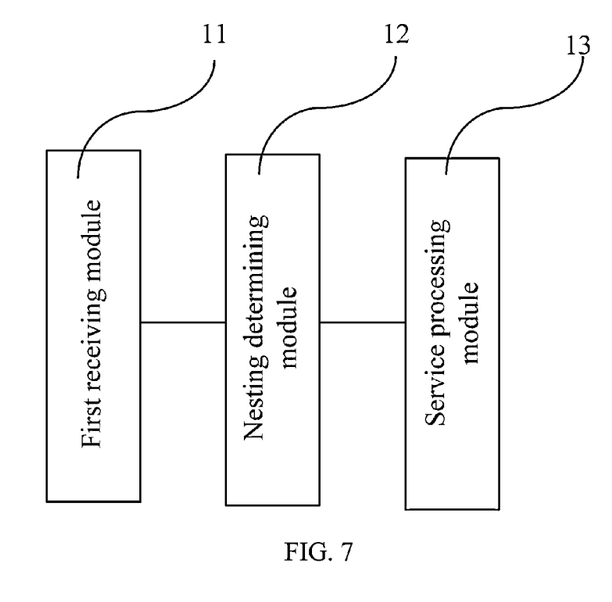
FIG. 7 is a schematic structural diagram of Embodiment 1 of a broadband service nesting processing device of the present invention.

An embodiment of the present invention further provides a broadband service nesting processing device, where the processing device may be an application server of a terminating call service. FIG. 7 is a schematic structural diagram of Embodiment 1 of a broadband service nesting processing device of the present invention. As shown in FIG. 7, the device includes a first receiving module 11, a nesting determining module 12, and a service processing module 13. The first receiving module 11 is configured to receive a service request message sent to a user equipment, where an extended header field of the service request message carries a service identity of a current service; the nesting determining module 12 is configured to determine that service nesting is formed between a terminating call service and a service corresponding to the service identity of the current service; and the service processing module 13 is configured to evade the terminating call service according to a result of the service nesting formed between the terminating call service and the service corresponding to the service identity.

In this embodiment, for situations where service nesting may occur, a service identity is carried in an extended header field (PAS header field) of a service request message sent to a user equipment, enabling a broadband service nesting processing device in this embodiment to process a terminating call service according to the preceding service identity, that is, when determining that service nesting is formed between the current service and a subsequent terminating call service, implement nesting evading processing for the terminating call service to effectively solve a service nesting problem.

Figure 8:
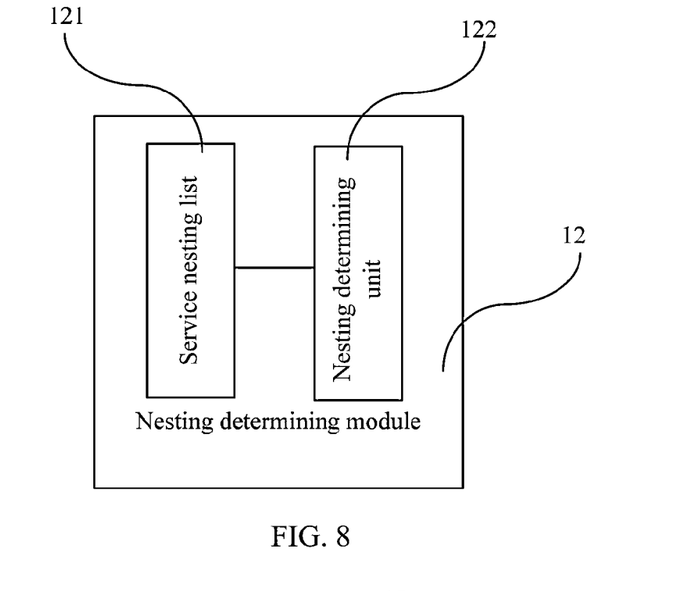
FIG. 8 is a schematic structural diagram of a nesting determining module in the embodiment shown in FIG. 7.

As shown in FIG. 8, the nesting determining module 12 in the preceding embodiment may specifically include a service nesting list 121 and a nesting determining unit 122, where the service nesting list 121 is configured to store mapping relationships between various terminating call services and services having service nesting relationships with the terminating call services; and the nesting determining unit 122 is configured to determine that service nesting is formed between a terminating call service and a service corresponding to the service identity of the current service. This is a solution for how to determine the existence of service nesting.

Figure 9:
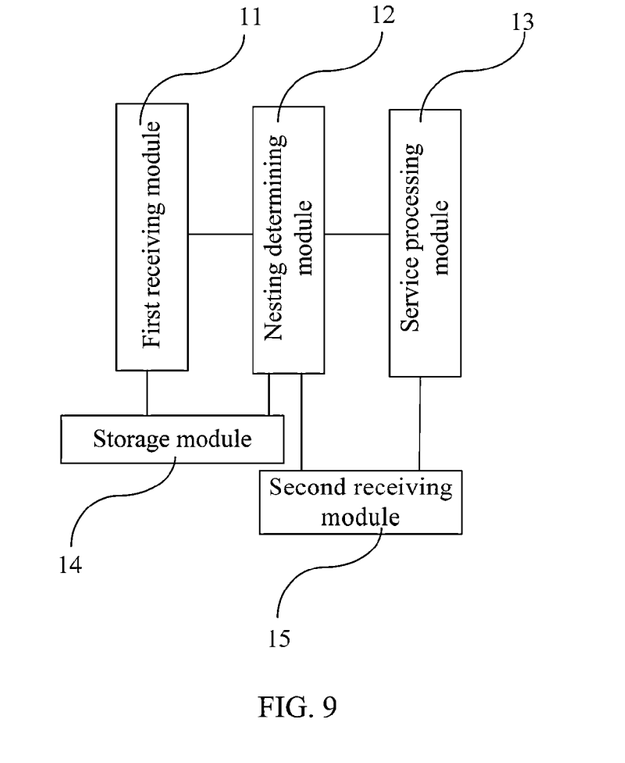
FIG. 9 is a schematic structural diagram of Embodiment 2 of a broadband service nesting processing device of the present invention.

As mentioned in the preceding nesting processing method embodiment, the broadband service nesting processing device has two situations: being arranged on a service application server (terminating call service server), or being arranged on a core network node. For the situation of being arranged on a terminating call server, as shown in FIG. 9, the broadband service nesting processing device further includes a storage module 14. The storage module 14 is configured to, after obtaining a service identity of a current service carried in a service request message, store the service identity of the current service. Specifically, the broadband service nesting processing device further includes a second receiving module 15. The second receiving module 15 is configured to receive a terminating call service request message. In this case, the nesting determining module 12 is specifically configured to determine that service nesting exists between a terminating call service corresponding to the terminating call service request message and a service corresponding to a stored service identity of a current service; and the service processing module 13 is specifically configured to control implementation of the terminating call service according to a result of the service nesting formed between the terminating call service and the service corresponding to the service identity.

Specifically, for a call hold service, a terminating call service, a hold tone needs to be played for a caller leg. However, when the preceding obtained service identity is a conference call service identity indicating that a user equipment is performing a previous click to conference service, the service processing module 13 further includes a first service processing unit. The first service processing unit is configured to perform call hold for a conference call service of a callee, and refuse to play a hold tone, preventing other participants of an ongoing conference from being affected. In addition, in this embodiment, a service identity is added to a PAS header field of a service request, and the two consecutive services do not need to share a basic service data table. Therefore, no coupling dependence is caused between different services.

Moreover, there is another situation, that is, the preceding broadband service nesting processing device is arranged on a core network node. The device considers terminating call services that may subsequently be implemented by the user equipment, and avoids the implementation of a subsequent terminating call service when service nesting is formed between a current service and the subsequent terminating call service. Specifically, when a service corresponding to a service identity is a wake-up call service and a terminating call service is a call transfer service, the service processing module includes a second service processing unit. The second service processing unit is configured to cancel the implementation of the call transfer service subscribed by the user equipment and directly forward the wake-up call service to the user equipment.

As described above, the broadband service nesting processing device provided in an embodiment of the present invention may be arranged on a core network node, and may also be arranged on a terminating call service server. Specifically, the broadband service nesting processing device may be a computer or any server implementing functions on the computer. Various functions implemented by various modules or units on the broadband service nesting processing device may be implemented by a processor of the computer.

Figure 10:
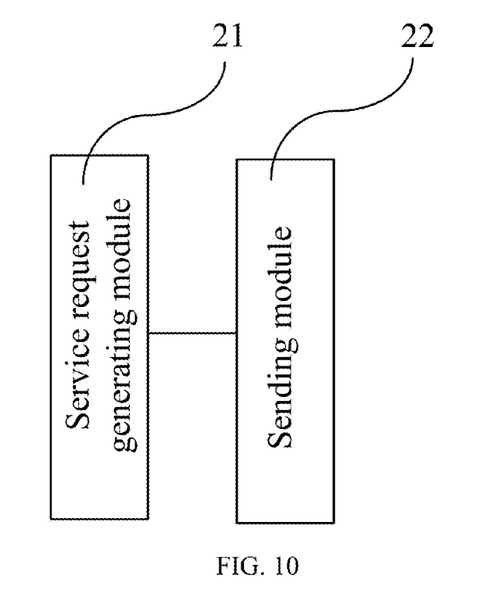
FIG. 10 is a schematic structural diagram of an embodiment of a service application server of the present invention.

FIG. 10 is a schematic structural diagram of an embodiment of a broadband service application server of the present invention. As shown in FIG. 10, the device includes a service request generating module 21 and a sending module 22, where the service request generating module 21 is configured to generate a service request message sent to a user equipment, and the service request message carries a service identity of a current service used to evade service nesting; and the sending module 22 is configured to send the service request message to a broadband service nesting processing device, so that the broadband service nesting processing device determines that service nesting is formed between a terminating call service and a service corresponding to the service identity of the current service, and evades the terminating call service according to a result of the service nesting formed between the terminating call service and the service corresponding to the service identity.

The service application server provided in this embodiment may be a computer or any server implementing functions on the computer. Various functions implemented by the service request generating module or sending module may be implemented by a processor of the computer. In this embodiment, a service identity of a current service is carried in the service request message sent by the service application server, enabling the broadband service nesting processing device to evade service nesting according to the service identity.

In addition, the present invention also provides a communications system of a broadband service nesting processing device in the embodiment shown in FIG. 7 or FIG. 8. In the communications system, a core network node or service application server (may be a terminating call service server) identifies a service process that has been triggered previously according to a service identity carried in a service request message, solving a service nesting problem.

Figure 11:
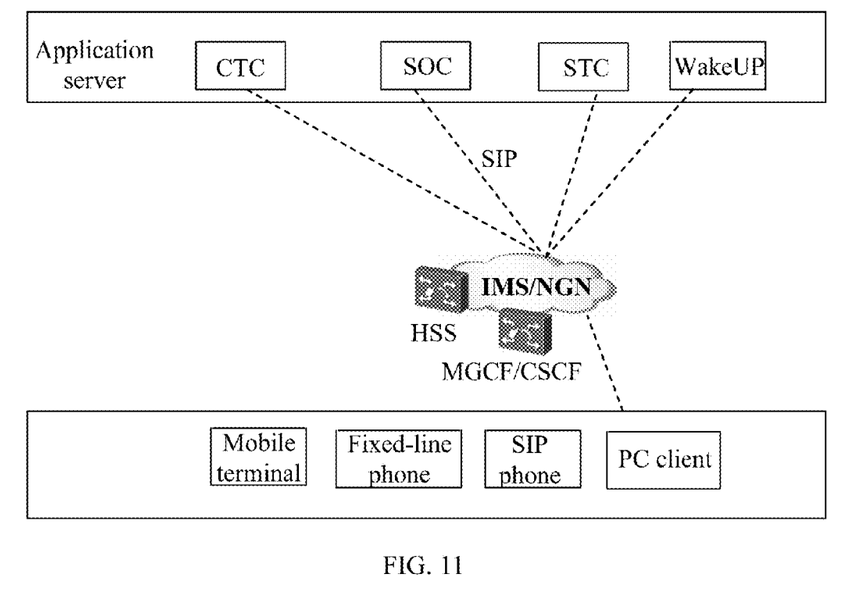
FIG. 11 is an architecture diagram of a communications system in an embodiment of the present invention.

FIG. 11 is a network architecture diagram of a communications system. The broadband service nesting processing device in the preceding embodiment of the present invention may be arranged on a core network node, for example, a media gateway control function (hereafter referred to as MGCF) or a call session control function (hereafter referred to as CSCF) on an IMS/NGN network. This situation applies to the embodiments shown in the preceding FIG. 4 and FIG. 5. When receiving a service request message sent to a user equipment, the core network node queries a terminating call service subscribed by the user equipment. If service nesting occurs between the preceding two services, the implementation of the terminating call service is prohibited. In addition, the communications system further includes service application servers such as a click to conference CTC application server, an SOC application server, a terminating call STC application server, and a wake-up call Wakeup server. The service application servers connect to various types of user equipments, such as mobile terminals, fixed-line phones, SIP phones, and PC clients, through an IMS/NGN network. The user equipments may subscribe to multiple application services, and nesting service processing devices may also be arranged on these servers. After receiving a service request message carrying a service identity, it stores service identity information; when receiving a subsequent terminating call service and determining that service nesting is formed between the terminating call service and a previously stored service identity, it prohibits the terminating call service. The technical solution provided in the embodiment of the present invention can effectively solve service nesting problems.

Persons of ordinary skill in the art should understand that all or part of the steps of the methods in the embodiments may be implemented by a program instructing relevant hardware. The program may be stored in a computer readable storage medium. When the program is run, the above steps of the methods in the embodiments are performed. The storage medium may be any medium capable of storing program codes, such as a ROM, a RAM, a magnetic disk, or an optical disk, and the like.

Finally, it should be noted that the embodiments of the present invention are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from the spirit and scope of the technical solutions of the embodiments of the present invention.

What is claimed is:

1. A broadband service nesting processing method, comprising:
   receiving a service request message sent to a user equipment, and obtaining a service identity of a service carried in the service request message;
   determining, according to a service nesting list and the service identity, that a service nesting is formed between a call service and the service corresponding to the service identity, wherein the service nesting list includes a mapping relationship between the call service and the service having a service nesting relationship with the call service; and
   evading the call service according to a result of the service nesting formed between the terminating call service and the current service corresponding to the service identity,
   wherein the service corresponding to the service identity is a conference call service, the call service is a call hold service, and the step of evading the call service comprises:
   holding the conference call service for the user equipment without playing a call hold tone to a caller leg of the user equipment.

2. The broadband service nesting processing method according to claim 1, wherein the service identity is set in a P-Asserted-Service (PAS) header field of the service request message, and the method further comprises:
   storing the service identity after obtaining the service identity.

3. The broadband service nesting processing method according to claim 2, further comprising:
   receiving a terminating call service request message; and
   determining the call service according to the terminating call service request message.

4. The broadband service nesting processing method according to claim 2, wherein the service identity is "P-Asserted-Service: sip:MO_CTC".

5. A network device capable of implement a broadband service nesting processing, comprising:
   a receiver configured to receive a service request message sent to a user equipment, wherein the service request message carries a service identity corresponding to a conference call service;
   a nesting determining device configured to determine that a service nesting is formed between a call service and the conference call service corresponding to the service identity according to the service identity and a service nesting list including a mapping relationship between the call service and the conference call service, wherein the call service is a call hold service; and
   a service processing device configured to hold the conference call service for the user equipment without playing a call hold tone to a caller leg of the user equipment.

6. The network device according to claim 5, further comprising:
   a storage module configured to store the service identity.

7. The network device according to claim 6, wherein the receiver is configured to receive a terminating call service request message requesting the call hold service sent by the user equipment.

8. The network device according to claim 5, wherein the service identity is carried in a header field of the service request message and is "P-Asserted-Service: sip:MO_CTC".

* * * * *

UNITED STATES PATENT AND TRADEMARK OFFICE
CERTIFICATE OF CORRECTION

PATENT NO. : 8,761,058 B2  Page 1 of 1
APPLICATION NO. : 13/938977
DATED : June 24, 2014
INVENTOR(S) : Chen

It is certified that error appears in the above-identified patent and that said Letters Patent is hereby corrected as shown below:

Title page, item (71), Applicant's City of Residence "Guangdong (CN)" should read
--Shenzhen (CN)--.

In the Claims:

Column 12, Claim 5, line 36 "implement a broadband" should read
--implementing a broadband--.

Signed and Sealed this
Twenty-third Day of September, 2014

Michelle K. Lee
*Deputy Director of the United States Patent and Trademark Office*